(12) United States Patent
Peterson et al.

(10) Patent No.: US 9,755,456 B1
(45) Date of Patent: Sep. 5, 2017

(54) CONTROL CIRCUIT FOR WIRELESS POWER

(71) Applicant: Electrochem Solutions, Inc., Clarence, NY (US)

(72) Inventors: Brian R. Peterson, Norton, MA (US); Eric Jankins, Raynham, MA (US)

(73) Assignee: Electrochem Solutions, Inc., Clarence, NY (US)

( * ) Notice: Subject to any disclaimer, the term of this patent is extended or adjusted under 35 U.S.C. 154(b) by 635 days.

(21) Appl. No.: 14/170,945

(22) Filed: Feb. 3, 2014

Related U.S. Application Data

(60) Provisional application No. 61/759,441, filed on Feb. 1, 2013.

(51) Int. Cl.
| | |
|---|---|
| *H02J 9/06* | (2006.01) |
| *H01F 38/14* | (2006.01) |
| *H02J 7/02* | (2016.01) |
| *H02J 50/12* | (2016.01) |

(52) U.S. Cl.
CPC .............. *H02J 9/061* (2013.01); *H01F 38/14* (2013.01); *H02J 7/025* (2013.01); *H02J 50/12* (2016.02)

(58) Field of Classification Search
None
See application file for complete search history.

(56) References Cited

U.S. PATENT DOCUMENTS

| 8,461,719 | B2 | 6/2013 | Kesler et al. | |
|---|---|---|---|---|
| 2006/0069412 | A1* | 3/2006 | Ginggen | H02J 7/025 607/33 |
| 2006/0217782 | A1* | 9/2006 | Boveja | A61N 1/0531 607/45 |
| 2009/0127934 | A1* | 5/2009 | Sbuell | G06K 19/0723 307/66 |
| 2010/0052426 | A1* | 3/2010 | Carter | G06F 1/26 307/64 |
| 2010/0327766 | A1* | 12/2010 | Recker | H02J 9/02 315/291 |
| 2011/0190849 | A1* | 8/2011 | Faltys | A61N 1/36053 607/50 |
| 2012/0086275 | A1* | 4/2012 | Chatterjee | H02J 1/10 307/52 |
| 2012/0119698 | A1* | 5/2012 | Karalis | B60L 11/182 320/108 |
| 2012/0235634 | A1 | 9/2012 | Hall et al. | |
| 2012/0256492 | A1* | 10/2012 | Song | H02J 1/102 307/66 |
| 2012/0292993 | A1* | 11/2012 | Mettler | H02J 7/0055 307/25 |
| 2014/0358195 | A1* | 12/2014 | Sauer | A61N 1/36125 607/60 |

* cited by examiner

*Primary Examiner* — Rexford Barnie
*Assistant Examiner* — David Shiao
(74) *Attorney, Agent, or Firm* — Steven W. Winn

(57) ABSTRACT

A power control circuit for wirelessly powering a device is described. The circuit comprises a series of sub-circuits that condition and modify electrical power received from near-field resonant inductive coupling. In addition, the power control circuit consists of a reserve power source of at least one capacitor. A switching circuit consisting of an ideal diode OR-ing circuit is provided that receives and selects between the primary and secondary electrical power sources based on their measured voltages.

23 Claims, 9 Drawing Sheets

CONTROL CIRCUIT FOR WIRELESS POWER

CROSS-REFERENCE TO RELATED APPLICATION

This application claims priority from U.S. Provisional Patent Application Ser. No. 61/759,441 filed Feb. 1, 2013.

FIELD OF THE INVENTION

The present invention relates to a circuit for controlling wireless electrical power. In particular, the invention relates to a circuit for controlling and modifying wireless electrical power to operate an electronic device.

PRIOR ART

It is often desirable to be able to power a portable electronic device without the need of a traditional electrical power cable that connects the device to an electrical power outlet. Electrical power cords tether devices and restrict their movement. Therefore, entangled power cords could cause confusion as to what cord is connected to a particular device and further delay in untangling the cords. These problems are particularly problematic when powering medical devices, such as electrically powered surgical tools that are used in an operating room environment.

Therefore, it is desirable to power portable electronic devices wirelessly without the need to plug the device into an electrical outlet. One such way of providing electrical power to a portable medical device is by using either primary or secondary electrochemical cells. However, the power requirements of some medical devices, particularly those requiring a relatively large amount of electrical power, typically require the use of large sized electrochemical cells. Such electrochemical cells often do not fit within the housing of these medical devices such as hand held medical devices having a relative small size. Furthermore, the use of an external battery pack is often not desired because battery packs add undesirable bulk and weight to relatively small medical devices. In addition, when these cells become depleted, through use of the device, the cells need to be replaced or recharged. In either case, use of the device is stopped to exchange or re-charge the cells. Such a delay in use of a medical device is not desirable, particularly when the device is being used to perform a surgical procedure.

An alternative means of providing electrical power to a device is by using near field resonant inductive coupling to wirelessly transfer electrical energy to the device. In near field resonant inductive coupling, electrical energy is transferred wirelessly between two resonators that are tuned to resonate at about the same frequency. The first or source resonator, is electrically connected to a power supply and the second or receiving resonator, is positioned a distance from the source resonator. When the two resonators resonate, an oscillating magnetic field between the two is created that enables transfer of electrical energy therebetween. More specifically, near field resonant inductive coupling typically uses coupled electromagnetic resonators with long-lived oscillatory resonant modes to transfer electrical power. Near field resonant inductive coupling is further discussed in U.S. Pat. No. 8,461,719 to Kesler et al.

However, electrical power that is transferred wirelessly between two resonators, such as by using near field resonant induction, is generally not in a condition for use in a portable medical device. This is particularly the case for those devices that require relatively large amounts of direct current electrical power. Therefore, there is a need for electrical circuitry that enables capture and conditioning of wireless electrical energy to power an electrical device. In addition, when using a medical device in an operating room environment, it is often desirable for the device to be capable of continuous operation. Therefore, there is an additional need to provide a reserve or backup electrical power supply that ensures continuous operation of a medical device, should the wireless power source become disrupted. The present invention, therefore, addresses these needs by providing an electrical power control circuit that enables use of wirelessly transferred electrical power. In addition, the present invention provides a reserve power source and associated circuitry that provides additional electrical power to operate a device.

SUMMARY OF THE INVENTION

The object of the present invention is, therefore, to provide an electrical power control system that enables an electric device, such as a portable medical device, to be powered by a wireless electrical energy source. More specifically, the present invention provides an electrical power control system that captures and conditions electrical energy transmitted wirelessly by near field resonant inductive coupling. In addition, a second object of the present invention is to provide a secondary power source that provides a reserve or back-up power supply for ensuring continuous operation of a device, should there be a disruption of the primary wireless power source.

The electrical power control circuit of the present invention is primarily divided into two sub-circuits, a primary power control circuit and a secondary power control circuit. Both the primary and secondary power control circuits work in concert together to power an electrical device. The primary power control circuit is designed to condition and modify the electrical power received wirelessly from the receiving resonator for use in an electrically powered device. The primary power control circuit comprises a matching electrical impedance, or network circuit, in addition to a rectifying circuit electrically connected to a primary power supply circuit. The secondary power control circuit is designed to provide reserve power should the primary electrical power source become interrupted. The secondary power control circuit comprises at least one rechargeable capacitor or electrochemical cell that serves as the secondary electrical power source. The capacitor or electrochemical cell is electrically connected to a charging circuit as well as a voltage regulator circuit that modifies the voltage of the electrical power emitted from the secondary source to sufficiently power a device. In addition, the electrical power control system is designed such that the secondary power source of the capacitor(s) and/or electrochemical cell(s) is charged by the primary wireless power source.

Both the primary and secondary power control circuits are electrically connected to an electrical power switching circuit which comprises an ideal diode OR-ing circuit that is capable of switching between the primary and secondary power sources. The primary and secondary power sources work in concert with each other to provide electrical energy to power an electronic device. Should the primary wireless power source become interrupted or insufficient to effectively power the device, the electrical power switching circuit actively switches to the secondary power source.

The electrical power switching circuit comprises an ideal diode OR-ing circuit having a controller and at least two field effect transistors (FET) that are used to switch between the primary and secondary power sources. The diode circuit is designed such that the controller actively monitors the voltage level between the primary and secondary power sources. In a preferred embodiment, the switching circuit controller actively selects the power source having the greater voltage between the primary and secondary power sources. Therefore, if the electrical energy provided by the primary source were to become insufficient or interrupted, the controller within the switching circuit would activate the secondary power source.

These and other objects of the present invention will become increasingly more apparent to those skilled in the art by reference to the following description and to the appended drawings.

DETAILED DESCRIPTION OF THE PREFERRED EMBODIMENTS

Figure 1:
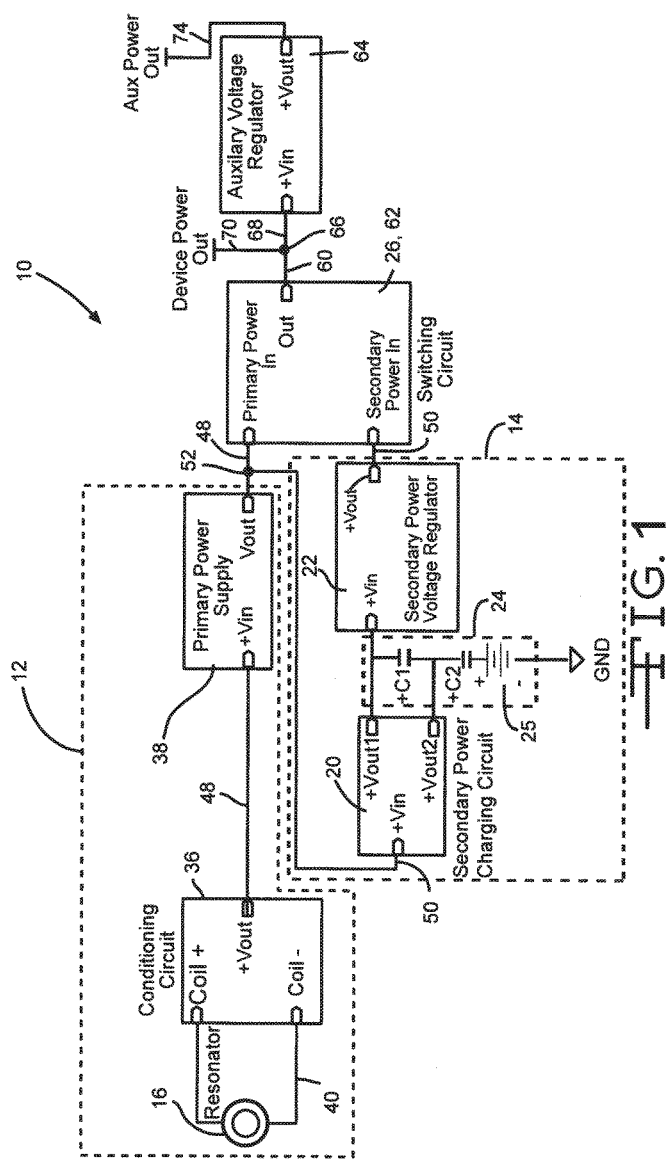
FIG. 1 is an electrical schematic diagram of an embodiment of the wireless power control system of the present invention.

Now turning to the figures, FIG. 1 illustrates an electrical schematic diagram of an embodiment of a wireless electrical power control circuit 10 of the present invention. The power control circuit 10 is designed to modify and regulate electrical power for use in an electronic device, such as a portable medical device. More specifically, the power control circuit 10 of the present invention is designed to harness and condition wirelessly received electrical power having an alternating current (AC) for use in electronic devices that are operated with direct current (DC) electrical power.

Figure 8:
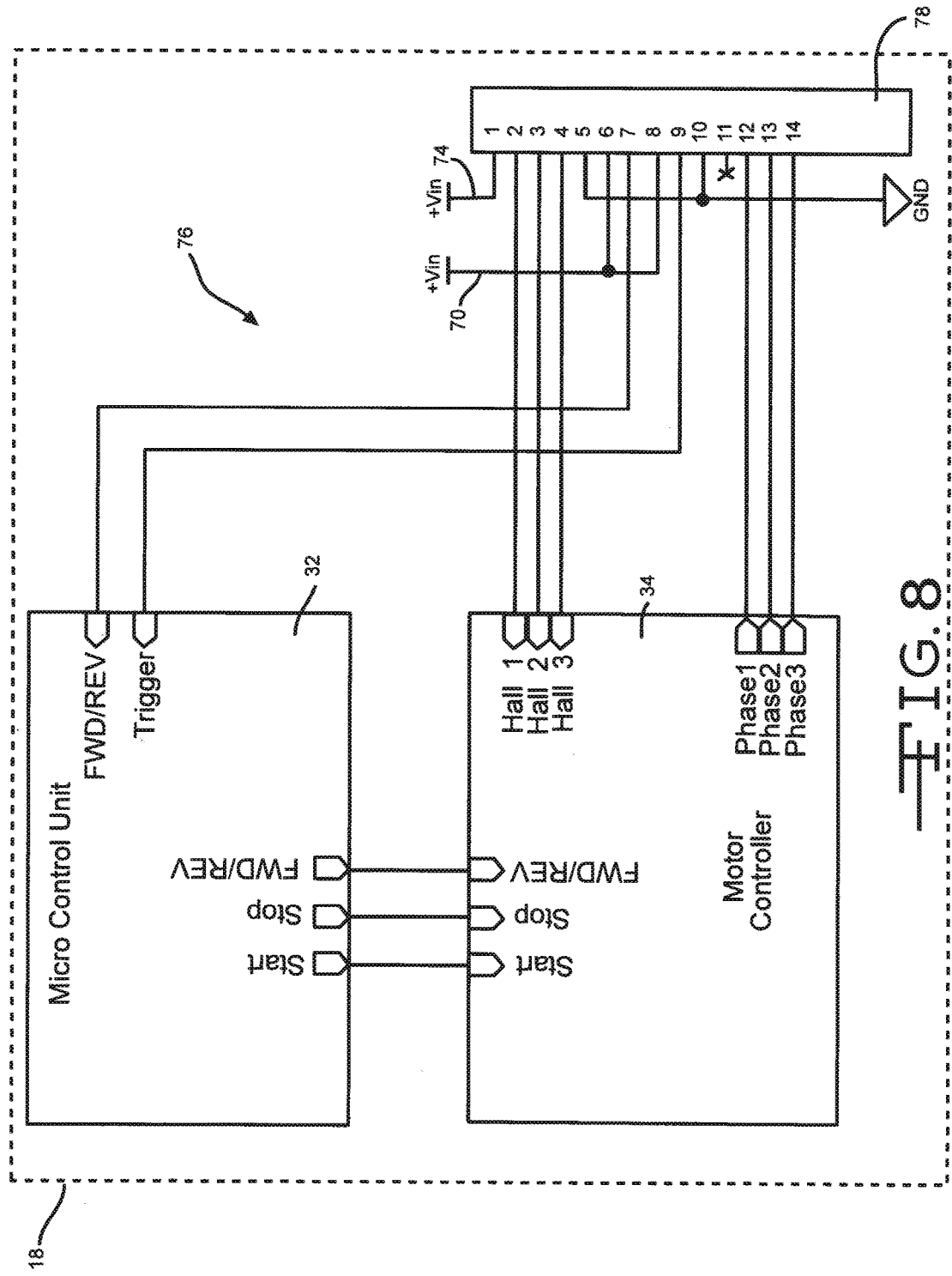
FIG. 8 is an electrical schematic diagram of an embodiment of a device control circuit comprising a micro control unit and motor controller that is capable of utilizing the power control system of the present invention.

As illustrated, the power control system 10 comprises a primary power control circuit 12 and a secondary power control circuit 14 that are electrically connected to each other. The primary power control circuit 12 is designed to harness and convert a primary electrical power source that is transmitted wirelessly between a transmitting resonator (not shown) to a receiving resonator 16, for use in powering an electronic device 18 (FIG. 8). More specifically, the primary power control circuit 12 is designed to capture and modify alternating current electrical power that is transmitted wirelessly via near field resonant inductive coupling such that the electrical power can be used to operate an electronic device.

The secondary power control circuit 14 is designed to serve as a power reserve to the primary power control circuit 12 within the power control system 10. Should the primary wireless power source become insufficient or disrupted, the secondary power source and associated secondary power control circuit 14 will take over in powering the device. As shown in FIG. 1, the secondary power control circuit 14 comprises at least one capacitor, $C_1$ that is electrically connected to a secondary power source charging circuit 20 and a secondary power voltage regulator circuit 22. In a preferred embodiment, the secondary power control circuit 14 comprises two capacitors, $C_1$ and $C_2$ that each has a capacitance ranging from about 1 F to about 100 F at a rated voltage of between about 1V to about 5V. These capacitors, $C_1$ and $C_2$, preferably serve as the secondary electrical power source 24. In addition, an electrochemical cell 25, such as a secondary electrochemical cell could also be used as the secondary electrical power source 24. Capacitors C1 and/or C2 could be substituted for by the electrochemical cell 25. Alternatively, the secondary electrical power source 24 could comprise both a capacitor, C1, C2 and an electrochemical cell 25.

In a preferred embodiment, both the primary and secondary power control circuits 12, 14 are electrically connected in parallel to a switching circuit 26. The switching circuit 26 preferably comprises an ideal diode OR-ing circuit 28 (FIG. 6) that actively monitors the voltage being emitted from the primary and secondary power control circuits 12, 14. A controller 30 (FIG. 6) electrically connected within the switching circuit 26, actively determines which of the primary or secondary control circuits 12, 14 to open and close based on their respective measured voltages. Thus, depending on the voltage level being emitted from the primary and secondary control circuits 12, 14, the connected device 18 will be powered by either the primary electrical power source or the secondary electrical power source.

In a preferred embodiment, as shown in the electrical schematic of FIG. 8, which will be described in more detail hereinafter, the electrical power control system 10 may be electrically connected to a micro control unit 32 and/or a motor control unit 34 residing within an electrically powered device 18. The wireless electrical power that is captured and modified by the power control system 10 of the present invention is designed to enable the use of wireless electrical power by a plurality of non-limiting electronic devices. Such devices may include, but are not limited to, portable electronic devices such as radios, sensors and transmitters, as well as medical devices such as saws, drills and medical monitors. In a preferred embodiment, the wireless electrical power control system 10 of the present invention may be used to harness and modify wireless electrical power to enable operation of devices requiring from about 1V to about 50V as well as devices requiring the use of about 1 watt to about 2,000 watts of electrical power.

In near-field resonant inductive coupling, a source resonator is electrically connected to an electrical power generator with direct electrical connections. A receiving resonator, positioned a distance away from the source resonator, is electrically connected to a load (i.e., a device) with direct electrical connections. The source and receiving resonators are coupled via a magnetic field therebetween to exchange electrical energy wirelessly between the source and the receiving resonators in order to transmit electrical power from the power generator to the device.

A resonator may be constructed such that the energy stored by the electric field is primarily confined within the resonator structure and energy stored by the magnetic field is primarily in the region surrounding the resonator. Thus, the electrical energy exchange is mediated primarily by the resonant magnetic near-field surrounding the space about the resonators. The resonator, sometimes referred to as a "coil", is generally constructed by wrapping a metallic wire around a core of magnetic material. Additional information about resonators utilized in near field resonant induction power transfer can be found in U.S. patent application publication no. 2012/0235634 to Hall et al.

As illustrated in the electrical schematic diagram of FIG. 1, in a preferred embodiment, the primary power control circuit 12 comprises a wireless electrical power conditioning circuit 36 that is electrically connected to a primary power supply circuit 38. The wireless electrical power conditioning circuit 36 is electrically connected to a main input power line 40 that is connected to the receiving resonator 16.

Figure 2:
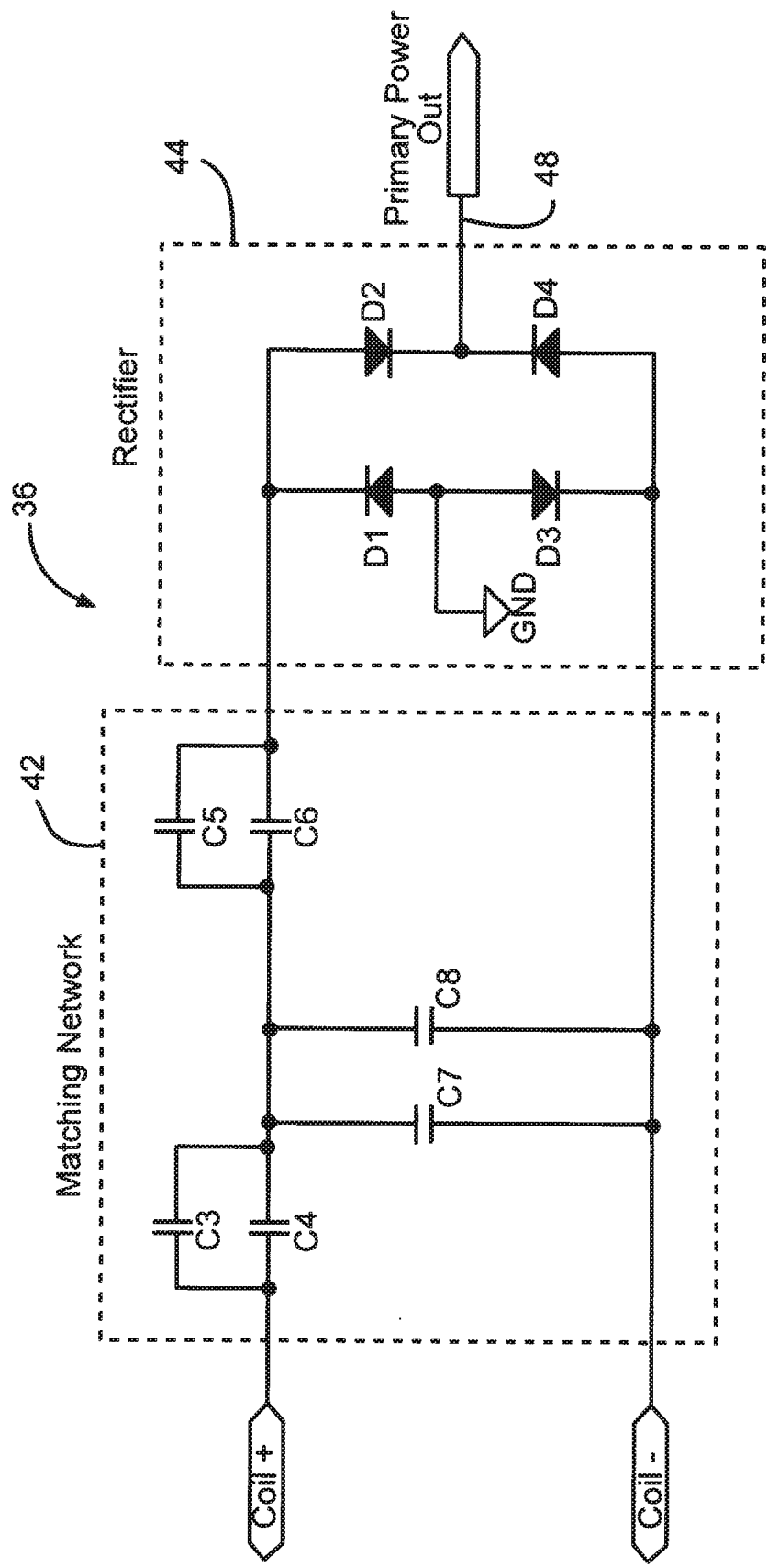
FIG. 2 is an electrical schematic diagram of an embodiment of an electrical power conditioning circuit of the wireless power control system comprising a matching electrical impedance circuit and a rectifying circuit.

FIG. 2 illustrates an embodiment of an electrical schematic diagram of the wireless electrical power conditioning circuit 36 of the present invention. The conditioning circuit 36 serves to prepare the alternating current of the electrical power received from the receiving coil 16 and convert it to direct current electrical power for use in powering an electronic device. As shown in the electrical schematic of FIG. 2, the conditioning circuit 36 comprises an electrical impedance matching or network circuit 42 that is electrically connected to a rectifying circuit 44. The impedance matching circuit 42 is designed to adjust and match the electrical impedance of the receiving resonator 16 and/or the device 18 to a characteristic impedance of the power generator or the load at a driving frequency of the source resonator. In general, the efficiency and amount of electrical power delivered between the source resonator and a device is largely dependent on the impedance of the inductive element of the source and receiving resonators relative to the electrical properties of the device. Therefore, the impedance-matching network circuit 42 is designed to maximize the efficiency of the electrical power delivered between the source resonator (not shown) and the device 18. As illustrated in FIG. 2, the matching network circuit 42 comprises a series of capacitors $C_3$-$C_8$ that are arranged to actively adjust and match the electrical impedance of the receiving resonator 16 and/or the device 18 to the electrical impedance of the source resonator and connected electrical power source.

Once the wireless electrical power passes through the matching network circuit 42, the primary electrical power continues through the rectifying circuit 44. In a preferred embodiment, the rectifying circuit 44 modifies the electrical current of the primary electrical power from alternating current to direct current. In a preferred embodiment illustrated in the electrical schematic of FIG. 2, the rectifying circuit 44 comprises a series of diodes, $D_1$-$D_4$.

After the wireless electrical power has been rectified to direct current, the power passes through the primary power supply circuit 38 (FIGS. 1 and 3) where it is modified to output a primary electrical power having a voltage suitable for powering a device. In a preferred embodiment, the primary power supply circuit 38 modifies the voltage of the primary electrical power to a required voltage of the device being powered. The primary power supply circuit 38 may increase the voltage or decrease the voltage of the primary electrical power depending upon the device being powered.

Figure 3:
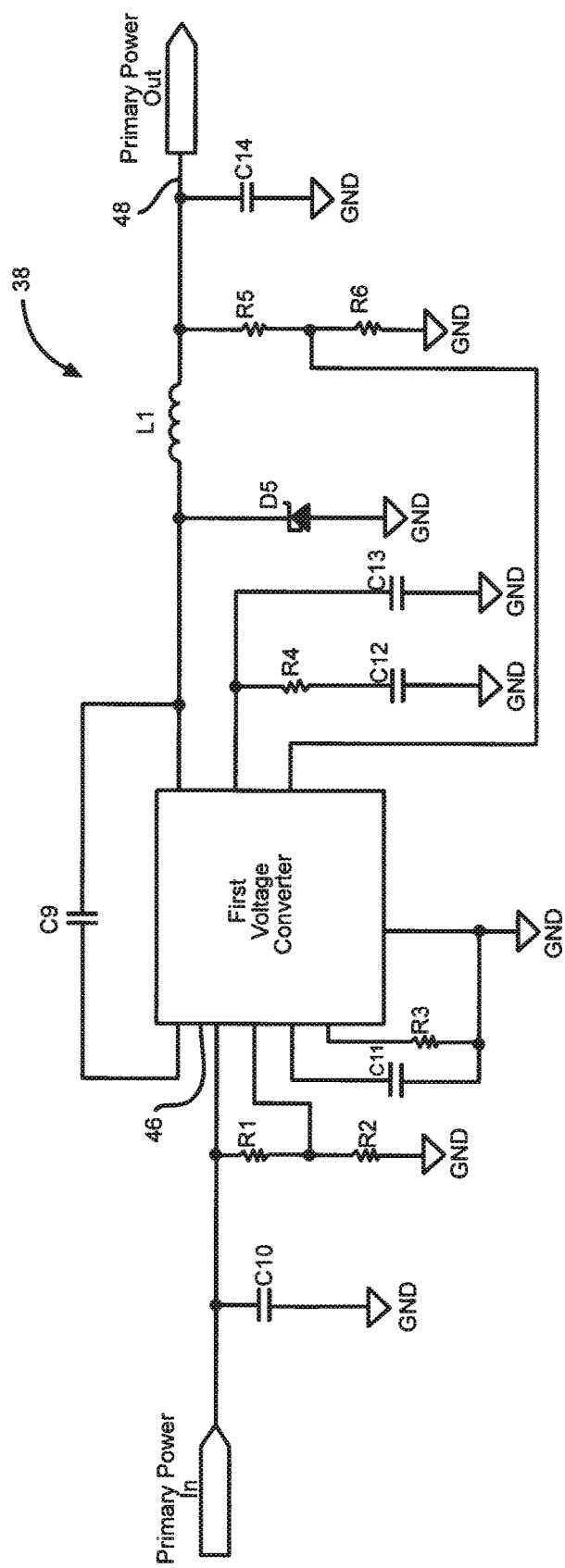
FIG. 3 shows an electrical schematic diagram of an embodiment of a primary power supply circuit utilized in the power control system of the present invention.

FIG. 3 illustrates an embodiment of an electrical schematic diagram of the preferred primary power supply circuit 38 for use in the power control system 10 of the present invention. As illustrated, the power supply circuit 38 comprises a series of capacitors, $C_9$-$C_{14}$ a series of resistors $R_1$-$R_6$, a diode $D_5$ and an inductor $L_1$ that are arranged to enable operation of the primary power supply 38. In addition to the series of electrical components, the primary power supply circuit 38 comprises a first voltage converter 46 that is designed to modify the voltage of the primary electrical power received from the rectifying circuit 44 to a desired primary output voltage level. In a preferred embodiment, the first voltage converter 46 may comprise a step-down voltage converter or alternatively, a step-up voltage converter. In either case, the first voltage converter 46 adjusts the voltage output of the primary electrical power to a desired voltage to power a device. In a preferred embodiment, the primary voltage output of the primary electrical power may range from about 1V to about 50V. In a more preferred embodiment, the output of the primary voltage is about 14.5V. The modified primary electrical power, having a first voltage, exits the primary power supply 38 along primary source power line 48.

As shown in FIG. 1, after passing through the primary power supply circuit 38, the primary source power line 48 branches off to form an additional power line, secondary source power line 50 at node 52. In a preferred embodiment, node 52 is the point at which the primary source power line 48 diverges into the two power lines, the primary source power line 48 and the secondary source power line 50. Node 52 is preferably positioned between the primary power supply circuit 38 and the switching circuit 26. After passing through node 52, the primary source power line 48 enters the switching circuit 26. The secondary source power line 50 continues to the secondary power source control circuit 14 where the wireless power is used to charge capacitors, $C_1$ and/or $C_2$, of the secondary power source control circuit 14.

Figure 4:
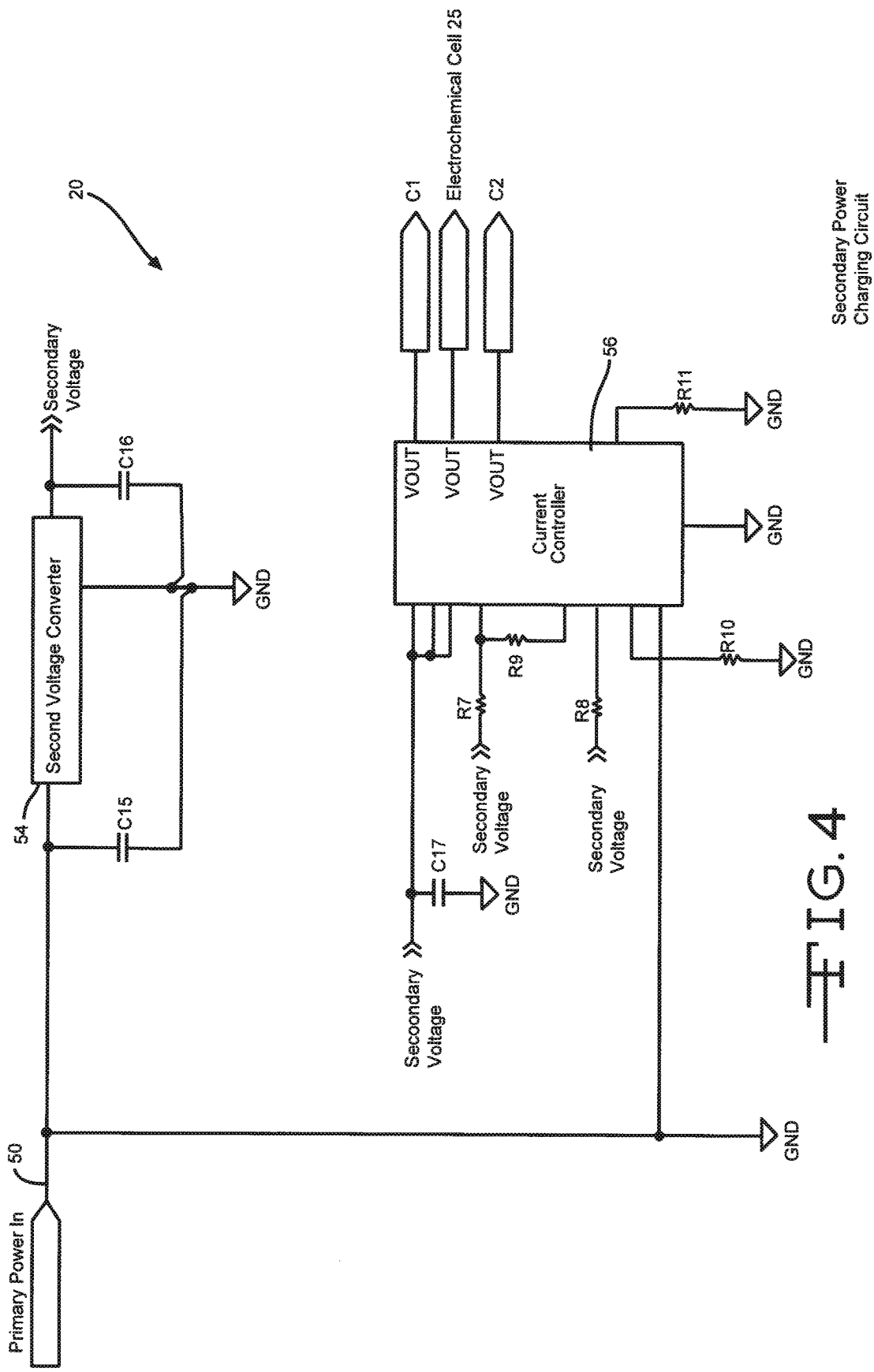
FIG. 4 is an electrical schematic diagram of an embodiment of a secondary electrical power charging circuit utilized in the power control system of the present invention.

FIG. 4 illustrates an embodiment of an electrical schematic diagram of the secondary power charging circuit 20 of the present invention. As shown, the secondary power charging circuit 20 comprises a second voltage converter 54 that modifies the voltage of the electrical power passing through the secondary source power line 50 to a voltage suitable for charging the secondary source capacitors $C_1$ and/or $C_2$. In addition, the second voltage converter 54 may modify the voltage of the electrical power to a voltage suitable for charging the secondary electrochemical cell 25. In a preferred embodiment, the second voltage converter 54 comprises a step-down voltage converter that reduces the voltage of the primary electrical current coming from the primary power supply 38 to about 2.5V. Alternatively, the second voltage converter 54 may comprise a step-up converter that increases the voltage of the primary electrical power coming into the secondary source power line 50. In either case, the second voltage converter 54 of the capacitor charging circuit 20 is designed to modify the voltage of the primary source electrical power to an appropriate voltage that adequately charges the secondary source 24, i.e., capacitor $C_1$, $C_2$ and/or electrochemical cell 25. In addition, the secondary power charging circuit 20 comprises a secondary current controller 56. In a preferred embodiment, the current controller 56 actively monitors and balances the charge level of the secondary source capacitors $C_1$, $C_2$ and/or electrochemical cell 25. If the charge level of the capacitors $C_1$, $C_2$ or the electrochemical cell 25 is determined to be too low, the incoming electrical power from the secondary source power line 50 is appropriately adjusted to charge the secondary source 24. If however, the charge level of the capacitors $C_1$, $C_2$ and/or the electrochemical cell 25, is determined not to be adequate, the current controller 56 will be used to maintain the charge on the capacitors $C_1$, $C_2$ until such time that they are used to power the system. Alternatively, if the charge level of the capacitors C1, C2 and/or the electrochemical cell 25 is determined to be adequate, the current controller 56 redirects the electrical power to the primary source power line 48 for use in the device.

Figure 5:
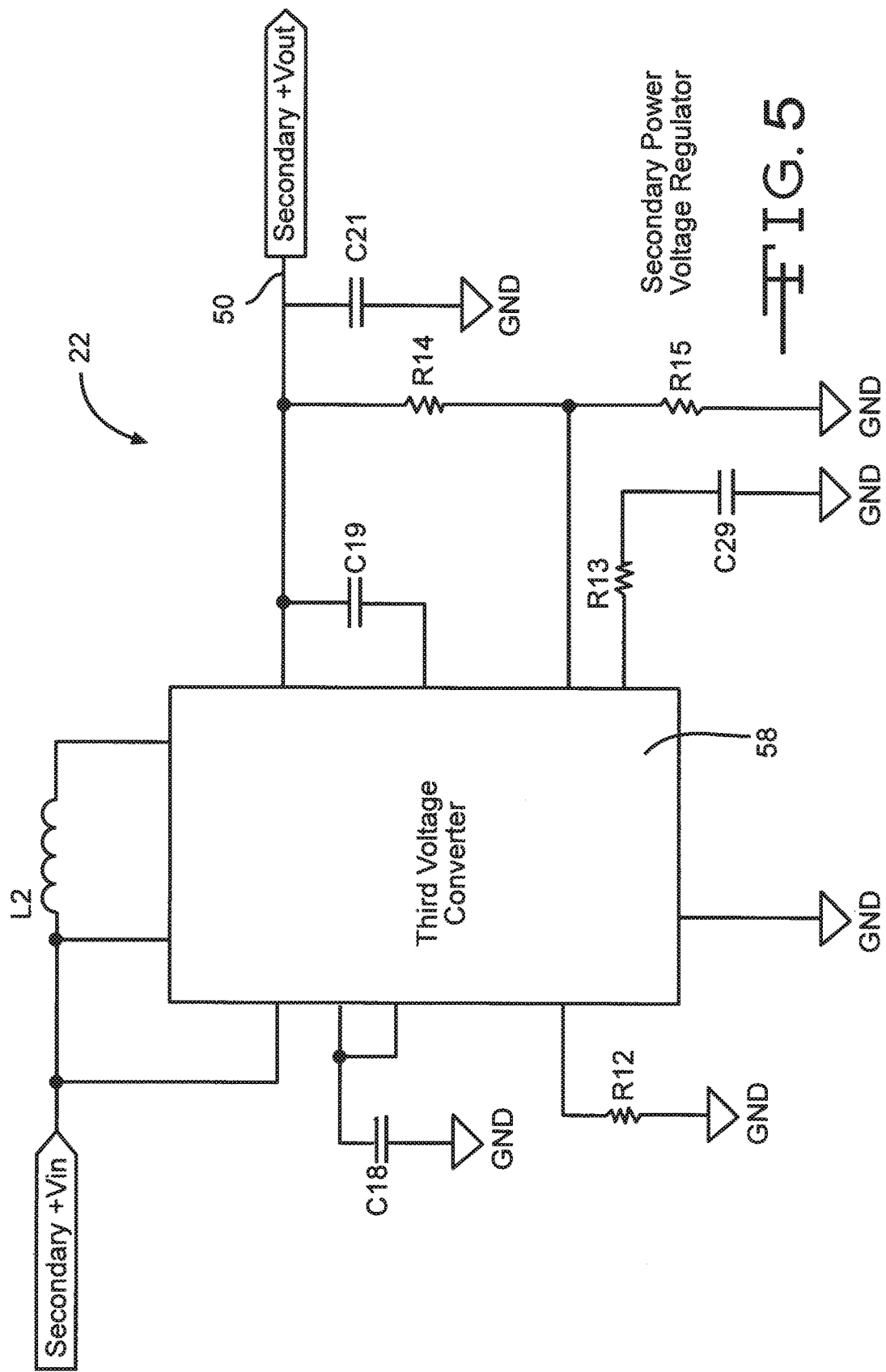
FIG. 5 shows an electrical schematic diagram of an embodiment of a voltage regulator circuit utilized in the power control system of the present invention.

FIG. 5 illustrates an embodiment of an electrical schematic diagram of the secondary power voltage regulator circuit 22. The secondary voltage regulator circuit 22 is designed to adjust the voltage level of the electrical power emitted by the secondary electrical power source 24. In a preferred embodiment, the secondary voltage regulator circuit 22 comprises a third voltage converter 58 that adjusts the amount of voltage of the electrical power coming from the secondary source 24. The modified secondary electrical power having a second voltage exits the voltage regulator circuit 22 along secondary source power line 50. In a preferred embodiment, the third voltage converter 58 is a step-up converter that increases the second voltage of the electrical power of the capacitors $C_1$, $C_2$ and/or the electrochemical cell 25 to a desired level. Alternatively, the third voltage converter 58 may comprise a step-down converter that decreases the second voltage of the secondary source electrical power to a desired level. In either case, it is preferred that the second voltage of the secondary electrical power source 24 is about the same as the first voltage of the primary electrical power source. In addition to the third voltage converter 58, the secondary voltage regulator circuit 22 comprises a series of capacitors, $C_{18}$-$C_{21}$, resistors $R_{12}$-$R_{15}$, and an inductor, $L_2$ to facilitate operation of the secondary power voltage regulator circuit 22.

Figure 6:
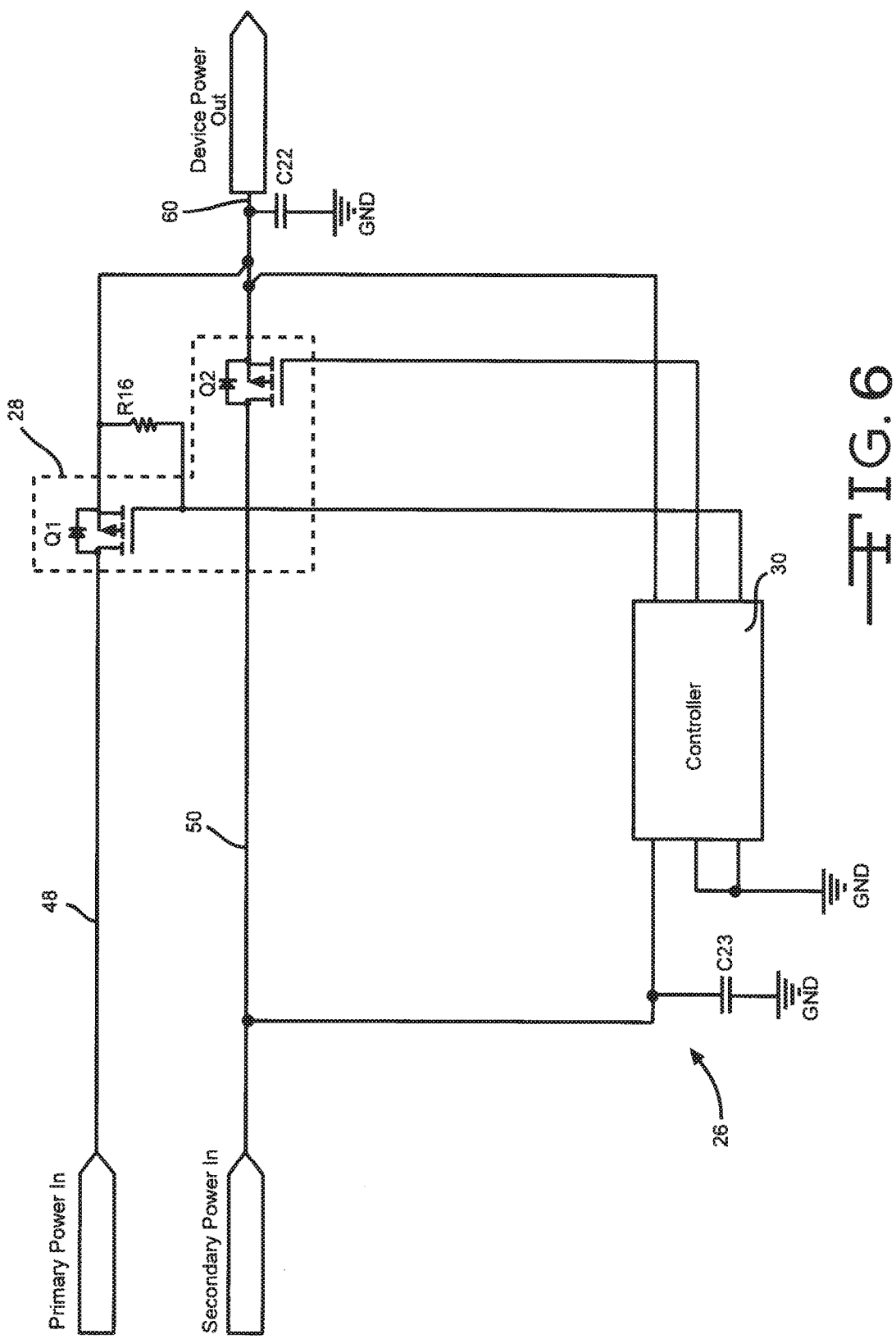
FIG. 6 is an electrical schematic diagram of an embodiment of an electrical power switching circuit utilized in the power control system of the present invention.

FIG. 6 illustrates an embodiment of an electrical schematic diagram of the switching circuit 26. The switching circuit 26 is configured to receive and select electrical power from multiple sources. In a preferred embodiment, the switching circuit 26 is configured to select and receive electrical power from the primary wireless electrical source and the secondary electrical source 24 of capacitors $C_1$, $C_2$ and/or electrochemical cell 25. As shown in the electrical schematic diagram of FIG. 6, each of the respective power lines 48, 50 of the primary and secondary power sources is electrically connected in parallel within the switching circuit 26. In an embodiment, the switching circuit 26 is an ideal diode OR-ing circuit 28 comprising a first switching element $Q_1$ and a second switching element $Q_2$. In a preferred embodiment, each of the first and second switching elements $Q_1$ and $Q_2$ are field effect transistors (FET). In addition, the circuit 26 comprises a resistor, $R_{16}$ and two capacitors, $C_{22}$ and $C_{23}$.

As shown in the electrical schematic diagram of FIG. 6, each of the respective primary and secondary power lines 48, 50 is electrically connected to a switching element within the circuit 26. The primary source power line 48 is electrically connected to the first switching element $Q_1$ and the secondary source power line 50 is electrically connected to the second switching element $Q_2$. In addition, the switching circuit 26 comprises a switching controller 30. In a preferred embodiment, the switching controller 30 is configured to detect the respective first and second voltages at an input of the switching element $Q_1$, $Q_2$ of each of the two power lines 48, 50. In a preferred embodiment, the first voltage is monitored and measured for the primary electrical power (power line 48) and the second voltage is monitored and measured for the secondary electrical power (power line 50). The controller 30 then determines which of the switching elements $Q_1$, $Q_2$ are to be switched on or off based at least in part on the detected voltages (the first voltage or the second voltage) at the input of each of the switching elements $Q_1$, $Q_2$.

In a preferred embodiment, logic is used to control the switching elements $Q_1$, $Q_2$ of the respective power lines 48, 50. In a preferred embodiment, the switches $Q_1$, $Q_2$ operate on a time clock cycle. In one embodiment, the logic senses, for each time clock cycle, the input voltage on each power input line 48, 50 to determine the best power source. A suitable power source may correspond to a voltage that is above a particular threshold criterion, such as that which provides a voltage above a particular level that is deemed useful. For example, the voltage required to operate the device 18. When the best power source is identified on a given time clock cycle, the power input line 48, 50 for the selected power source is closed, and the switch of the other power input line 48, 50 is opened. For example, if the primary power source is selected, switching element $Q_1$ is closed and switching element $Q_2$ is opened, thereby allowing electrical power of the primary wireless source to flow. In either case, the selected electrical power exits the switching circuit 26 through a third power line 60 (FIGS. 1 and 6).

Figure 6A:
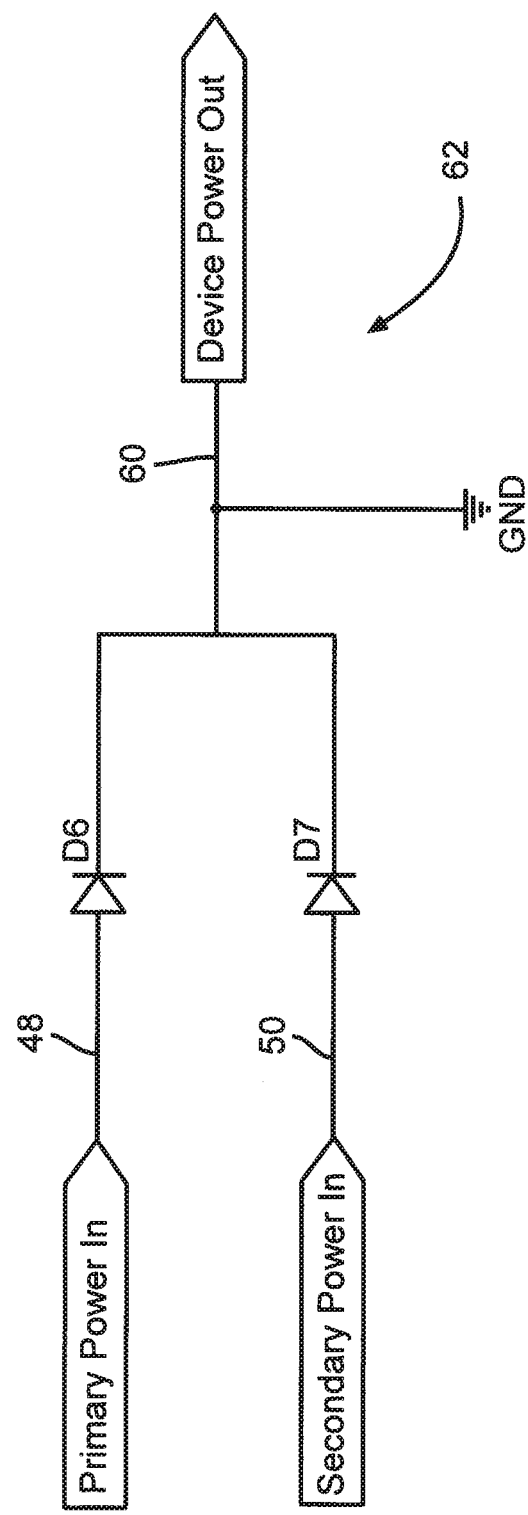
FIG. 6A is an electrical schematic diagram of an alternate embodiment of an electrical power switching circuit.

Alternatively, the ideal diode OR-ing circuit 28 may be substituted for by the electrical power switching circuit 62 shown in the electrical schematic diagram of FIG. 6A. In this alternate embodiment, the electrical power coming from the primary source (power line 48) or the secondary source (power line 50) may be controlled through the use of diodes. As shown, diode $D_6$ is electrically connected to the primary power line 48 and diode $D_7$ is electrically connected to the secondary power line 50. Therefore, flow of electrical power coming from either the primary or secondary power source can be managed through opening or closing respective diodes $D_6$, $D_7$.

It is noted that when the switching element $Q_1$ or $Q_2$, as well as when diode $D_6$, $D_7$ is closed, electrical power, electrical current, or electrical voltage is allowed to flow from the respective primary or secondary power sources, through the switching circuit 26 to the third power line 60 that exits therethrough. When the respective switching element $Q_1$, $Q_2$ or diode $D_6$, $D_7$ is closed and electrical power, electrical current, or electrical voltage is allowed to flow through the switching circuit 26, this is considered to be the "on" position for the switching element. Likewise, when the respective switching element $Q_1$, $Q_2$ or diode $D_6$, $D_7$ is open and electrical power, electrical current, or electrical voltage is not allowed to flow through the switching circuit 26, this is considered to be the "off" position for the switching element.

Figure 7:
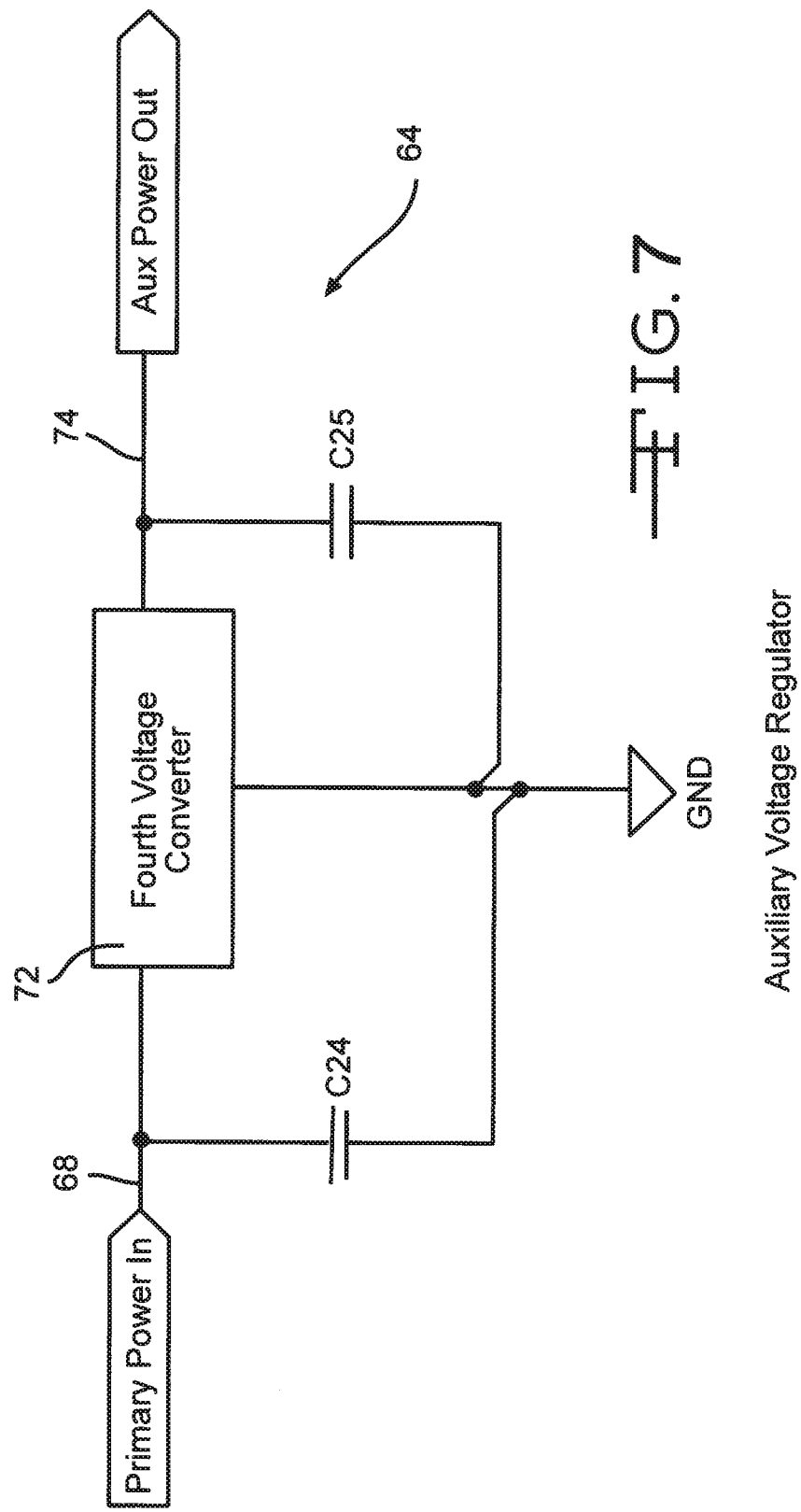
FIG. 7 is an electrical schematic diagram of an embodiment of an auxiliary voltage regulator circuit.

FIG. 7 illustrates an embodiment of an auxiliary voltage regulator circuit 64 that may be optionally connected to the power control system 10 of the present invention. As illustrated in FIG. 1, the auxiliary voltage regulator circuit 64 may be electrically connected to the switching circuit 26. As illustrated, a portion of the electrical power exiting the switching circuit 26, 62 may be directed to the auxiliary voltage regulator circuit 64. As shown, in FIGS. 1 and 7, electrical power exiting the switching circuit 26, 62 travels through power line 60. At node 66, power line 60 diverges into power line 68 and power line 70. As shown, power line 68 enters auxiliary voltage converter 64 and power line 70 extends to power a device 18.

In a preferred embodiment, the auxiliary voltage regulator circuit 64 comprises a fourth voltage converter 72 in addition to capacitors $C_{24}$ and $C_{25}$ as shown. Like the other voltage regulator circuits 20, 22, and 38, the auxiliary voltage regulator circuit 64 may comprise a step-up and/or step down voltage converter. In an embodiment, the voltage converter 64 may modify the output voltage of the electrical power to about 1V to about 50V. The auxiliary voltage regulator circuit 72 may be used to power an auxiliary device component such as an additional sensor or microcontroller. As shown in FIGS. 1 and 7, power line 74 exits the auxiliary voltage regulator circuit 64.

FIG. 8 illustrates an electrical schematic diagram of an embodiment of a device control circuit 76 that may utilize the wireless power control circuit 10 of the present invention. As illustrated, the exemplar control circuit 76 of the device comprises a micro control unit 32 and a motor controller 34 that are electrically connected to each other. In the example shown, other electrical connections are illustrated that allow operation of an electrical motor such as start, stop, forward and reverse. A connector 78 provides additional electrical connections between the micro control unit 32, the motor controller 34 and the power control circuit 10 of the present invention. In an embodiment, the electrical power output of the switching circuit 26, 62, through power line 70 is electrically connected to position 6 and 8 of the connector 78. In addition, the auxiliary electrical power output, power line 74, of the auxiliary voltage regulator 64, is shown connected to position 1 of the connector 78. While the embodiment shown in FIG. 8 illustrates an example of the electrical power outputs of the switching circuit 26, 62 and auxiliary voltage regulator 64 attached to electrical connector 78 through power lines 70 and 74, it is contemplated that these respective power outputs can be directly connected to different components or other locations of the device or to multiple devices.

It is appreciated that various modifications to the inventive concepts described herein may be apparent to those of ordinary skill in the art without departing from the spirit and scope of the present invention as defined by the appended claims.

What is claimed is:

1. An electrical power control circuit, comprising:
    a) a resonator configured to receive an electrical power wirelessly transmitted by near-field resonant inductive coupling;
    b) a primary power control circuit, comprising:
        i) a conditioning circuit configured to modify the wirelessly received electrical power from an alternating current to a direct current electrical power, the conditioning circuit electrically connectable to the resonator; and
        ii) a primary power supply circuit electrically connected to the conditioning circuit, the primary power supply circuit comprising a first voltage regulator circuit configured to modify a first voltage of the direct current electrical power from the conditioning circuit, wherein the primary power supply circuit is configured to output a primary electrical power having the first voltage to a primary power line;
    c) a secondary power control circuit electrically connected to the primary power control circuit, the secondary power control circuit comprising:
        i) a secondary electrical power source;
        ii) a second voltage regulator circuit electrically connected to the secondary electrical power source, wherein the second voltage regulator circuit is configured to output a secondary electrical power having a second voltage from the secondary electrical power source to a secondary power line;
        iii) a secondary electrical power charging circuit electrically connected to the secondary electrical power source and to the primary power line, wherein the secondary electrical power charging circuit is configured to electrically charge the secondary electrical power source with the primary electrical power; and
    d) a switching circuit electrically connectable in parallel with the primary power line of the primary power control circuit and the secondary power line of the secondary power control circuit, the switching circuit comprising:
        i) a first field effect transistor electrically connected to the primary power line;
        ii) a second field effect transistor electrically connected to the secondary power line; and
        iii) a switching controller configured to detect the first voltage at a first input of the first field effect transistor and the second voltage at a second input of the second field effect transistor; and
    e) wherein, based on at least the detected first and second voltages, actuation of the switching controller causes either the first field effect transistor or the second field effect transistor to be configured to pass electrical current from the switching circuit to a third power line exiting the switching circuit.

2. The power control circuit of claim 1 wherein the first field effect transistor or the second field effect transistor having the greater of the detected first or second voltage is configured to pass electrical current from the switching circuit to the third power line exiting the switching circuit.

3. The power control circuit of claim 1 wherein the first field effect transistor or the second element field effect transistor having the lesser of the detected first or second voltage is configured to prevent passage of electrical current from the switching circuit to the third power line exiting the switching circuit.

4. The power control circuit of claim 1 wherein the secondary power source comprises at least one capacitor and/or at least one electrochemical cell.

5. The power control circuit of claim 1 wherein the conditioning circuit comprises an impedance matching circuit and a rectifying circuit.

6. The power control circuit of claim 1 wherein the first voltage regulator circuit comprises a first step-up or step-down voltage converter.

7. The power control circuit of claim 1 wherein the secondary electrical power charging circuit comprises a second step-up or step-down voltage converter.

8. The power control circuit of claim 1 wherein the second electrical power charging circuit comprises a current controller configured to modify a current of the primary electrical power.

9. The power control circuit of claim 1 wherein the second voltage regulator circuit comprises a third step-up or step-down voltage converter.

10. The power control circuit of claim 1 wherein the switching circuit comprises an ideal diode OR-ing circuit.

11. The power control circuit of claim 1 further comprising an auxiliary voltage regulator circuit electrically connectable to the switching circuit, wherein the auxiliary voltage regulator circuit comprises a fourth step-up or step-down voltage converter.

12. The power control circuit of claim 1 configured to be electrically connectable to a device selected from the group consisting of an electric motor, a sensor, and a radio.

13. The power control circuit of claim 1 wherein the first or second voltage ranges from 1V to 50V.

14. The power control circuit of claim 1 wherein the primary or secondary electrical power ranges from 1 watt to 2,000 watts.

15. An electrical power control circuit, comprising:
   a) resonator configured to receive an electrical power wirelessly transmitted by near-field resonant inductive coupling;
   b) a primary power control circuit, comprising:
      i) an electrical impedance matching circuit and electrical rectifying circuit that are electrically connectable to the resonator, wherein the rectifying circuit is configured to modify the wirelessly received electrical power from an alternating current to a direct current electrical power; and
      ii) a primary power supply circuit having a first voltage regulator electrically connected to the electrical impedance matching circuit and to the electrical rectifying circuit, wherein the first voltage regulator is configured to modify a first voltage of the direct current electrical power from the electrical rectifying circuit, and wherein the primary power supply circuit is configured to output a primary electrical power having the first voltage to a primary power line;
   c) a secondary power control circuit electrically connected to the primary power control circuit, the secondary power control circuit comprising:
      i) at least one capacitor or electrochemical cell;
      ii) a secondary electrical power charging circuit electrically connected to the at least one capacitor or electrochemical cell and being electrically connectable to the primary power line, wherein the secondary power charging circuit is configured to charge the at least one capacitor or electrochemical cell with the primary electrical power; and
      iii) a second voltage regulator circuit electrically connected to the at least one capacitor or electrochemical cell, wherein the second voltage regulator circuit is configured to output a secondary electrical power having a second voltage from the at least one capacitor or electrochemical cell to a secondary power line;
   d) a switching circuit electrically connected to the primary power line of the primary power control circuit and to the secondary power line of the secondary power control circuit, the switching circuit comprising:
      i) a first field effect transistor electrically connected to the primary power line;
      ii) a second field effect transistor electrically connected to the secondary power line; and
      iii) a switching controller configured to detect the first voltage at a first input of the first field effect transistor and the second voltage at a second input of the second field effect transistor; and
   e) wherein, based on at least the detected first and second voltages, actuation of the switching controller causes either the first field effect transistor or the second field effect transistor to be configured to pass electrical current from the switching circuit to a third power line exiting the switching circuit.

16. The power control circuit of claim 15 wherein the first field effect transistor or the second field effect transistor having the greater of the detected first or second voltage is configured to pass electrical current from the switching circuit to the third power line exiting the switching circuit.

17. The power control circuit of claim 15 wherein the first or second voltage ranges from 1V to 50V.

18. The power control circuit of claim 15 wherein the primary or secondary electrical power ranges from 1 watt to 2,000 watts.

19. An electrical power control system, comprising:
   a) an electrical device;
   b) a receiving resonator electrically connected to the electrical device, wherein the receiving resonator is configured to harness electrical power transmitted wirelessly by a source resonator positioned a distance away from the receiving resonator, and wherein the receiving resonator and the source resonator are configured for near-field resonant inductive coupling;
   c) a primary power control circuit, comprising:
      i) an electrical impedance matching circuit and an electrical rectifying circuit that are electrically connectable to the receiving resonator, wherein the electrical rectifying circuit is configured to modify the harnessed electrical power from an alternating current to a direct current electrical power; and
      ii) a primary power supply circuit having a first voltage regulator circuit electrically connected to the electrical impedance matching circuit and to the electrical rectifying circuit, wherein the first voltage regulator circuit is configured to modify a first voltage of the direct current electrical power from the rectifying circuit, and wherein the primary power supply circuit is configured to output a primary electrical power having the first voltage to a primary power line;
   d) a secondary power control circuit electrically connected to the primary power control circuit, the secondary power control circuit comprising:
      i) at least one capacitor or secondary electrochemical cell;
      ii) a secondary power charging circuit electrically connected to the at least one capacitor or secondary electrochemical cell and being electrically connectable to the primary power line, wherein the secondary power charging circuit is configured to charge the at least one capacitor or secondary electrochemical cell; and
      iii) a second voltage regulator circuit electrically connected to the at least one capacitor or secondary electrochemical cell, wherein the second voltage regulator circuit is configured to output a secondary electrical power having a second voltage from the at least one capacitor or secondary electrochemical cell to a secondary power line; and
   e) a switching circuit electrically connected to the primary power line of the primary power control circuit and to the secondary power line of the secondary power control circuit, the switching circuit comprising:
      i) a first field effect transistor electrically connected to the primary power line;
      ii) a second field effect transistor electrically connected to the secondary power line; and
      iii) a switching controller configured to detect the first voltage at a first input of the first field effect transistor and the second voltage at a second input of the second field effect transistor; and
   f) wherein, based on at least the detected first and second voltages, actuation of the switching controller causes either the first field effect transistor or the second field effect transistor to be configured to pass electrical current from the switching circuit to a third power line exiting the switching circuit.

20. The electrical power control system of claim 19 wherein the first field effect transistor or the second field effect transistor having the greater of the detected first or the second voltage is configured to pass electrical current from the switching circuit to the third power line exiting the switching circuit.

21. The electrical power control system of claim 19 wherein the first or second voltage ranges from 1V to 50V.

22. The electrical power control system of claim 19 wherein the primary or secondary electrical power ranges from 1 watt to 2,000 watts.

23. The electrical power control system of claim 10 wherein the electrical device is selected from the group consisting of an electric motor, a sensor, and a radio.

* * * * *

UNITED STATES PATENT AND TRADEMARK OFFICE
CERTIFICATE OF CORRECTION

| | | |
|---|---|---|
| PATENT NO. | : 9,755,456 B1 | Page 1 of 1 |
| APPLICATION NO. | : 14/170945 | |
| DATED | : September 5, 2017 | |
| INVENTOR(S) | : Brian R. Peterson and Eric Jankins | |

It is certified that error appears in the above-identified patent and that said Letters Patent is hereby corrected as shown below:

In the Claims

Column 10, Line 31 (Claim 3, Line 2) delete "element"

Column 10, Line 49 (Claim 8, Line 1) delete "second" and insert --secondary--

Column 11, Line 5 (Claim 15, Line 2) before the word "resonator" insert --a--

Signed and Sealed this
Twenty-first Day of November, 2017

Joseph Matal
*Performing the Functions and Duties of the
Under Secretary of Commerce for Intellectual Property and
Director of the United States Patent and Trademark Office*